United States Patent [19]

Bowen

[11] Patent Number: 5,086,458
[45] Date of Patent: Feb. 4, 1992

[54] TELEPHONE ANSWERING SYSTEM AND APPARATUS FOR DIRECT CALLER SELECTION OF A PARTY LINE EXTENSION

[75] Inventor: James H. Bowen, Catharpin, Va.

[73] Assignee: Product Engineering & Manufacturing, Inc., Catharpin, Va.

[21] Appl. No.: 415,852

[22] Filed: Oct. 2, 1989

[51] Int. Cl.⁵ .................... H04M 1/72; H04M 13/00
[52] U.S. Cl. ................................ 379/180; 379/182
[58] Field of Search ............... 379/165, 180, 179, 182, 379/373

[56] References Cited

U.S. PATENT DOCUMENTS

| | | | |
|---|---|---|---|
| 4,675,899 | 6/1987 | Ahuja | 379/180 |
| 4,701,949 | 10/1987 | Lynch et al. | 379/180 |
| 4,723,271 | 2/1988 | Grundtisch | 379/179 X |
| 4,741,024 | 4/1988 | Del Monte et al. | 379/181 |
| 4,910,764 | 3/1990 | Bowen | 379/100 |
| 4,926,467 | 5/1990 | Meier | 379/179 X |
| 4,974,253 | 11/1990 | Hashimoto | 379/100 |

Primary Examiner—Stafford D. Schreyer
Attorney, Agent, or Firm—Whitham & Marhoefer

[57] ABSTRACT

With a plug-in tone responsive unit at each extension, a central answering unit responds to a caller initiated, telephone company generated, ring signal on the telephone line and establishes a connection with the calling phone. Each of the remote units responds to a different predetermined tone frequency. When the caller pushes a key on a standard Touch Tone phone key pad to select a specific extension, the responding remote unit generates a ringing signal for that extension.

7 Claims, 3 Drawing Sheets

TELEPHONE ANSWERING SYSTEM AND APPARATUS FOR DIRECT CALLER SELECTION OF A PARTY LINE EXTENSION

BACKGROUND OF THE INVENTION

1. Field of the Invention

The present invention generally relates to telephone answering systems, and more particularly to an economical system which allows direct caller selection of a line extension.

2. Description of the Prior Art

There are a number of telephone call answering systems in the prior art which allow a caller to choose to be connected to a specific telephone extension by pushing one or more keys on a standard tone generating key pad after dialing the basic number. U.S. Pat. No. 4,591,664 is one example of such prior art systems. These systems, while generally satisfactory in operation, are relatively costly to install as they connect through a central unit to the extension phone.

SUMMARY OF THE INVENTION

It is therefore an object of this invention to provide a plug-in call answering system which allows caller selection of an extension without special wiring to the extension. Another object is the provision of a plug-in system that can be used in premises with an installed multiextension phone line system without any rewiring. The system can be used with multiple phone extensions or computers connected via modem to the phone line and directly addressed from the incoming calling party without having dedicated phone lines and without special wiring to each modem.

Briefly, this invention contemplates the provision of a plug-in tone responsive unit at each extension. A central answering unit responds to a caller initiated, telephone company generated, ring signal on the telephone line and establishes a connection with the calling phone. Each of the remote units responds to a different predetermined tone frequency. When the caller pushes a key on a standard Touch Tone phone key pad to select a specific extension, the responding remote unit generates a ringing signal for that extension.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENT OF THE INVENTION

Figure 1:
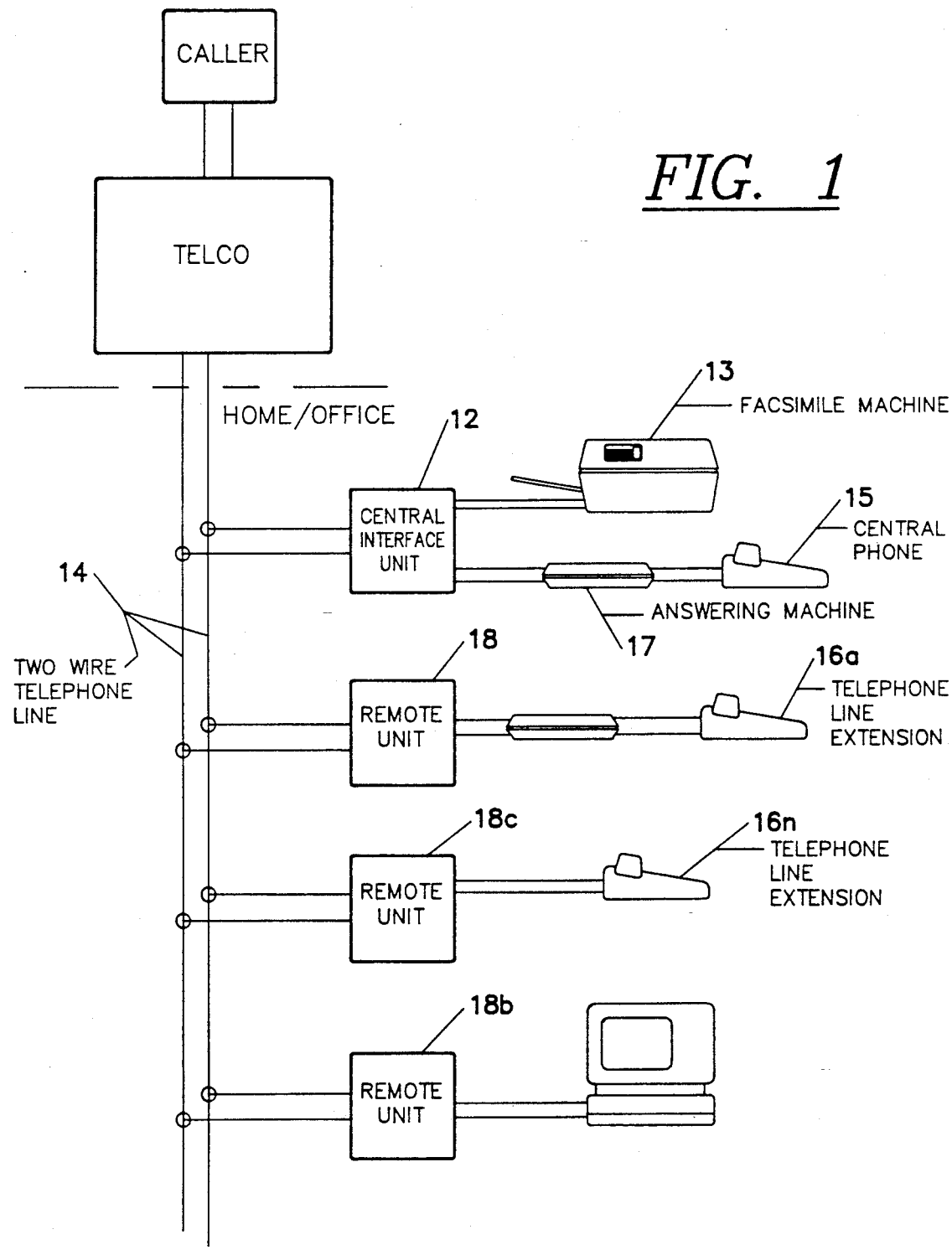
FIG. 1 is a block diagram of a telephone answering system in accordance with the teachings of this invention.

Referring now to the drawings, in which the same reference numeral indicates the same element in the various figures, FIG. 1 shows a central telephone answering and interface unit 12 which may be the unit described in my copending application Ser. No. 07/337,480 filed Apr. 13, 1989, now U.S. Pat. No. 4,910,704, entitled Facsimile and Voice Communications Interface Device or the central unit described herein. The central answering unit 12 is coupled to a conventional two wire telephone line 14; the connection can be and typically will be made inside the premises of a user by plugging a standard telephone cable from the unit 12 into a standard telephone outlet jack. Advantageously, a central phone 15 and an answering machine 17 are connected to the central unit 12. A facsimile machine 13 may also be coupled to the central unit 12.

A number of telephone line extensions 16a through 16n are coupled to the line 14 in parallel with the central unit 12 and with each other. Each extension 16 is plugged into a respective remote unit 18 which in turn is plugged into the line 14. Standard connectors and jacks may be used both to couple an extension to its remote unit and to couple the remote unit to the line. The telephone installation illustrated is typical of a multiple extension system in a private household, a small business, or a dormitory.

Figure 3:
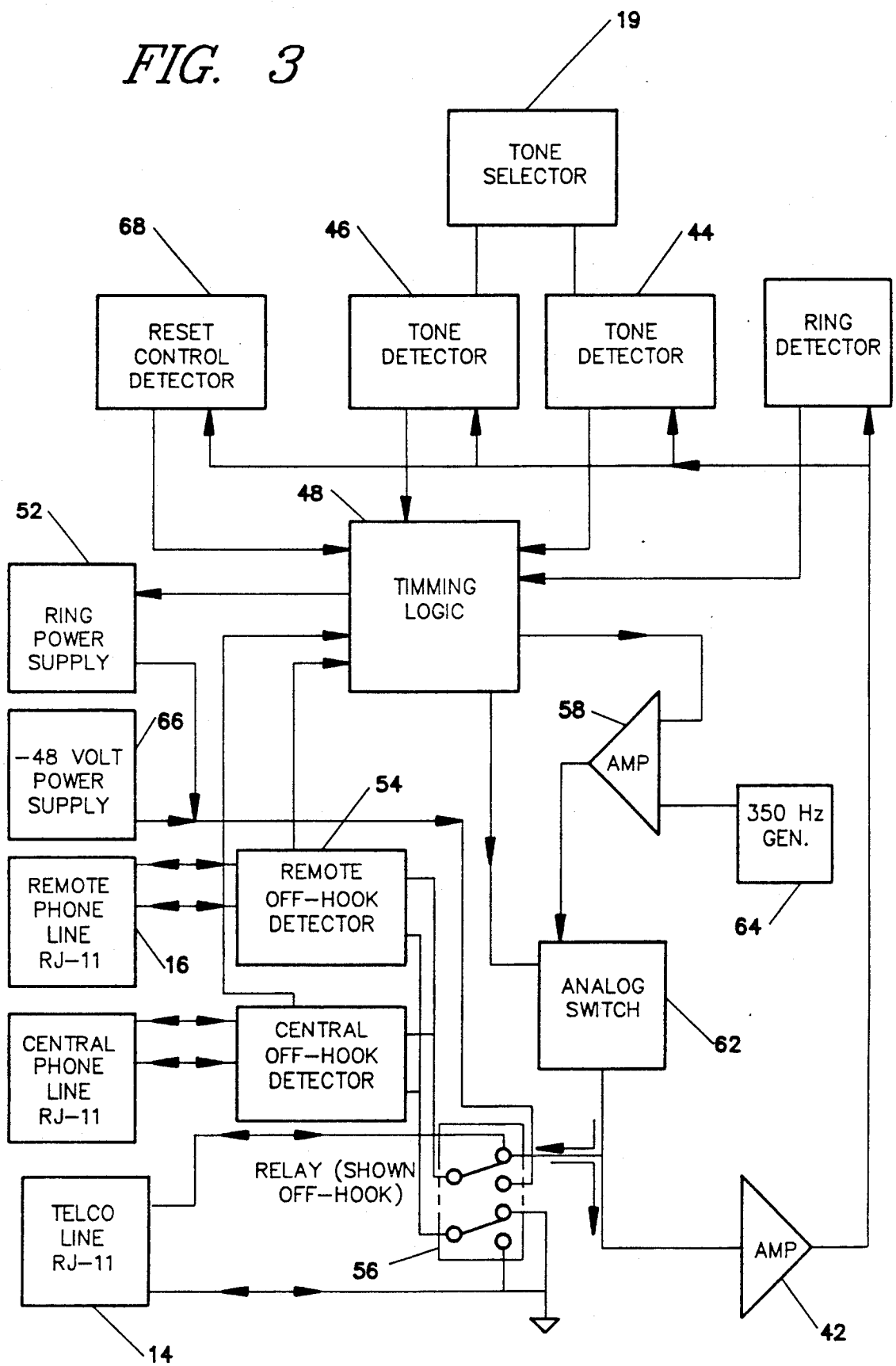
FIG. 3 is a block diagram of a plug-in remote unit in accordance with the teachings of this invention.

Each remote unit 18 has a set of switches 19, as described more fully in connection with FIG. 3, which are used to select a specific frequency of a standard telephone tone signal to which it will respond. The switches may be manually operable or responsive to code signals on the telephone line. In a specific embodiment, each remote unit is capable of responding to the tone frequencies generated when any one of the keys or a combination of keys are pushed by a caller. In an illustrative embodiment, each remote unit may be settable to respond to 1, 2, 4, 5, 7, 8, *, and 0. The switches 19 are set so that each remote unit will respond to only a select one or set of tones generated in response to one of these keys.

Figure 2:
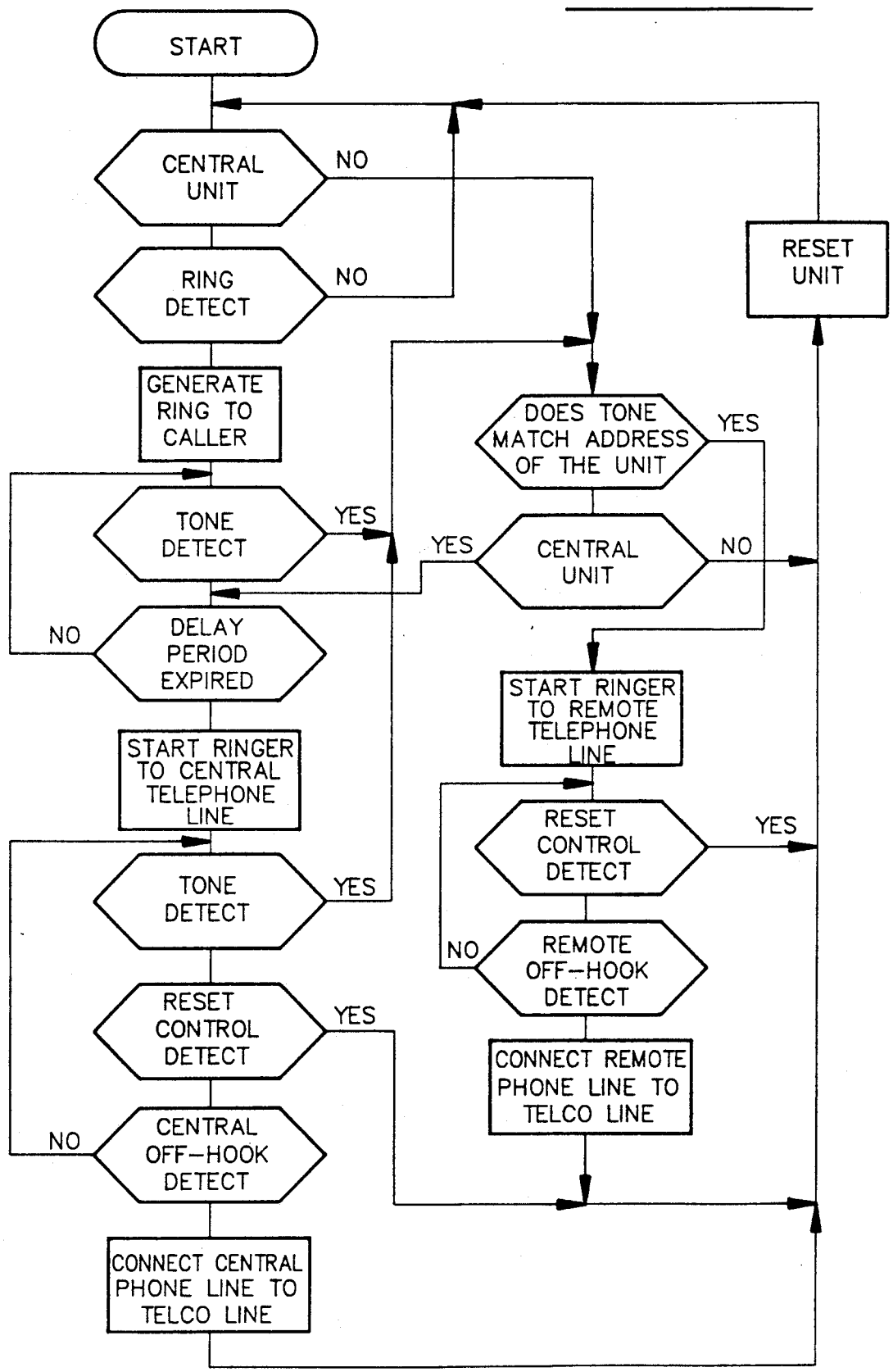
FIG. 2 is a flow diagram illustrating the functions of a system in accordance with the teachings of this invention.

As previously explained, the apparatus disclosed in my copending application may be used as the central answering unit 12 in the practice of this invention. The specification of this copending application, which is incorporated herein by reference, discloses a system which, among other things, serves to automatically detect a facsimile signal on the incoming line and direct a call to a facsimile machine. Such a feature may advantageously be incorporated in the system of this invention. However, facsimile is not necessary to the practice of this invention. FIG. 2 is a flow diagram of functions specific or particularly advantageous to the operation of this invention.

The basic central unit functions include answering the call and generating a tone which will be heard by the caller. The central unit functions are diagramed on the left-hand side of FIG. 2. The remote unit functions include listening for a certain caller generated tone and in response thereto generating a ring signal for the caller selected phone. These functions are diagramed on the right-hand side of FIG. 2.

Starting with the central unit functions, if a ring is detected, operating in a CENTRAL UNIT mode, the unit "answers" the incoming call and generates a RING TO CALLER signal. This signal may be similar to the ringing signal the telephone company generates for the caller but preferably at a distinctive pitch. In an installation in which there are two or more units which have both central and remote function capability the central function capability would ordinarily be disabled in all but one unit. Operating only as a remote unit, as indicated by NO at the CENTRAL UNIT functional block, the initial function of the unit is to monitor the line and respond to a selected signal on the line.

In this two function unit, the next functional step is TONE DETECT. TONE DETECT detects a caller generated signal to select a particular extension. As previously explained, the tone would typically be generated by the caller pushing one or more keys of a Touch Tone telephone. Of course the system could be responsive to any suitable tones. The next function is DOES TONE MATCH ADDRESS OF THE UNIT in which the tone is compared to the frequency for which the particular unit is set to respond and which will be explained in connection with the remote unit operation.

If a remote extension is not picked up within a delay period established by the DELAY PERIOD EXPIRED function, a locally generated ring signal is connected to the central telephone instrument 15 or answering machine 17 as indicated in the START RINGER TO CENTRAL TELEPHONE LINE functional box. During this time the unit can continue to listen for a caller generated signal as indicated in the TONE DETECT functional box.

The RESET CONTROL DETECT function resets the central unit functions when a caller hangs up without completing the call or when an extension completes the call. A dial tone signal may be used to activate the reset function. However, it should be noted that other suitable tone or current signals may be used.

The system senses an off hook condition of the central line at CENTRAL OFF-HOOK DETECT and when this condition is detected the central line is connected to the telephone line 14; the CONNECT CENTRAL PHONE LINE TO TELCO LINE function.

The functions of the remote unit are diagramed on the right hand side of FIG. 2. The remote unit functions to connect an extension to the line in response to a caller generated signal. If the central function apparatus and the remote function apparatus are provided for each extension, the central function apparatus would be disabled for all but one unit as indicated by the function box CENTRAL UNIT. Functioning only as a remote unit the line 14 is monitored for a caller generated signal that matches the signal for which the unit is set to respond. When a matching signal is detected at DOES TONE MATCH ADDRESS OF UNIT it activates a local ringer for the selected extension at START RINGER TO REMOTE TELEPHONE LINE. If the extension is picked up the off hook condition is detected at REMOTE OFF HOOK DETECT and the extension is connected to line 14 at CONNECT REMOTE PHONE LINE TO TELCO LINE.

When a call is in progress the line 14 is connected to the appropriate extension or central line. When the call is completed the RESET UNIT sets the line to an on hook status.

Referring now to FIG. 3, the remote unit 18 monitors the line 14 continuously. An amplifier 42 couples the line 14 to a pair of standard telephone tone detectors 44 and 46. For example, detector 44 could be set to receive the tones, but not limited to tones of 697, 770, and 852 Hz, and detector 46 is responsive to tones of 1336 and 1209 Hz. It will be appreciated that these standard commercially available tone detectors in this example could be set to receive the tones, but not limited to signals generated by pushing buttons 1,2,4,5,7,8,*, and 0 on a Touch Tone phone. The selector switch 19 provides a selectable bias input to detectors 44 and 46 so that they will respond only to a predetermined single tone or tone pair on line 14.

The standard $-50$ volt dc on line 14, signalling an on-hook line condition is used to bias the detectors 44 and 46 so that they are unresponsive to tones on the line when the line is in an on-hook condition. When the central unit 12 completes a call, the impedance of line 14 drops and the bias drops to the range of 3-6 volts dc, rendering the detectors 44 and 46 responsive to tones on the line.

In response to an output from the tone detectors 44 or 46, timing logic 48 generates an output which is coupled to a ring signal generator 52. The ring signal generator may be a standard signal of 90 volts 16-20 Hz, modulated on for approximately two seconds and off for approximately four seconds. A $-48$ volt d.c. power supply 66 is needed to make a residence phone operate so when it goes off hook this can be detected. A ringing signal is coupled to phone 16 causing it to ring.

An off-hook detector 54 detects an off-hook condition of attached phone 16 and in response to an off-hook condition operates a relay 56 which disconnects the ring signal from the phone 16. Off-hook detector 54 also transmits an off-hook signal to timing logic 48. In response to this input the timing logic couples outputs to an amplifier 58 and an analog switch 62 which in response couples a tone generator 64 (e.g. 350 Hz) to the line 14 for short interval (e.g. 150 milliseconds). This signal is detected by the dial tone detector of the central unit 12; this tone or a current change in the telco line resets the central unit and terminates the ringback signal to the caller. It will be appreciated that this short dial tone signal will appear on line 14 whenever any of the extensions 16 initially goes off-hook, thus signaling a previous off-hook extension that another extension has come on the line.

At the end of a phone conversation, the phone 16 is placed on-hook. The off-hook detector 54 causes relay 56 to switch to its on-hook position, breaking, the connection to the phone and coupling a $-48$ volt dc supply 66 to the phone so an off-hook condition can be detected.

In placing an outgoing call, the off-hook detector 54 operates the relay 56, connecting the extension 16 to the line 14. A dial tone detector 68 detects the dial tone on the line 14 and generates an output which is coupled to the timing logic 48 to inhibit outputs from the timing logic 48 in response to detected tones generated by the outgoing call. If the timing logic 48 has enabled the ring generator power supply 52, an output from detector 68 causes termination of the ring signal.

In operation, a caller will know the number of the extension he or she wants to reach. The caller dials a seven digit number identifying line 14. The central unit 12 completes the call and generates a ringing tone which the caller hears, but preferably at a pitch discernibly different from the ring tone generated by the phone company. The caller then pushes the keys on his or her Touch Tone key pad corresponding to the extension he or she wants to reach. When a remote unit 18 detects the tone on line 14 for which it is set, it generates a ringing signal at that extension. When that extension, or any extension, is picked up, the remote unit generates a dial tone signal for a short interval which resets the central unit and terminates the ringing tone on the line. If an extension other than the one selected by the caller picks up the phone, a dial tone generated by the remote unit for the picked-up phone resets the central unit. In addition, this dial tone is detected by the selected remote unit and that remote unit terminates the ringing signal to the selected extension.

If one of the extensions does not complete the call within a predetermined interval (e.g. two or three rings) the central unit responds by transferring the call to a central unit, such as a central phone extension or answering machine or both in succession.

While the invention has been described in terms of a single preferred embodiment, those skilled in the art will recognize that the invention can be practiced with modification within the spirit and scope of the appended claims. Although the unit described is with discrete components, it should be noted that those skilled in the art could also implement in software.

Having thus described my invention, what I claim as new and desire to secure by Letters Patent is as follows:

1. A remote unit for an automated telephone answering system for use with telephone extensions connected in parallel on a line, comprising in combination;
   means for coupling said remote unit to said line;
   means for coupling a telephone extension to said remote unit;
   means to detect a plurality of different caller generated tones;
   means to select at least one of said generated tones for response by said remote unit;
   means for generating a ring signal; and
   means to couple said ring signal to said telephone extension coupling means in response to detection of a tone selected by said selection means.

2. A remote unit for an automated telephone answering system for use with telephone extensions connected in parallel on a line, comprising in combination;
   means for coupling said remote unit to said line;
   means for coupling a telephone extension to said remote unit;
   means to detect a plurality of different caller generated tones;
   means to select at least one of said generated tones for response by said remote unit;
   means for generating a ring signal;
   means to couple said ring signal to said telephone extension coupling means in response to detection of a tone selected by said selection means; and
   means to inhibit response to said plurality of tones if said line has an on-hook status signal thereon.

3. A remote unit for an automated telephone answering system as claimed in claim 2 further including
   an off-hook detector for detecting an off-hook condition of an extension coupled to said extension coupling means;
   means to generate a tone; and
   means to couple said tone to said line for a short interval after an initial off-hook condition of said extension is detected.

4. An automated telephone answering system for telephone extensions coupled in parallel on a line, comprising in combination;
   a central unit for responding to incoming calls;
   means for coupling each of said units to said line;
   a plurality of remote units;
   means for coupling each of said units to said line;
   means to couple a telephone extension to each of said remote units;
   said remote units each having means to detect a plurality of caller generated tones;
   said remote units each having means to select at least one of said generated tones for response by said each remote unit;
   each of said remote units including ring signal generating means; and
   each of said remote units including means to couple said ring signal generating means to an extension coupled thereto in response to a tone for which it has been selected to respond.

5. An automated telephone answering system as claimed in claim 4 further including
   means to inhibit response to said plurality of tones if said line has an on-hook status signal thereon.

6. An automated telephone answering system as claimed in claim 4 further including
   an off-hook detector for detecting an off-hook condition of an extension coupled to said extension coupling means;
   means to generate a tone; and
   means to couple said tone to said line for a short interval after an initial off-hook condition of said extension is detected.

7. An automated telephone answering system for telephone extensions coupled in parallel on a line, comprising in combination;
   a central unit for responding to incoming calls;
   means for coupling said unit to said line;
   a plurality of remote units;
   means for coupling each of said units to said line;
   means to couple a telephone extension to each of said remote units;
   central unit means for sending a tone to a caller in response to an incoming call;
   means for coupling each of said remote units in parallel to said line independently of said central unit;
   said remote units each having means to detect a plurality of caller generated tones;
   said remote units each having means to select at least one of said generated tones for response by said each remote unit;
   each of said remote units including ring signal generating means; and
   each of said remote units including means to couple said ring signal generating means to an extension coupled thereto in response to a tone for which it has been selected to respond.

* * * * *